(12) United States Patent
Hollinger

(10) Patent No.: US 7,687,960 B2
(45) Date of Patent: Mar. 30, 2010

(54) PIGTAILED STATOR WINDINGS FOR ELECTRICAL GENERATOR

(75) Inventor: Ted Hollinger, Algona, IA (US)

(73) Assignee: Hydrogen Engine Center, Algona, IA (US)

( * ) Notice: Subject to any disclaimer, the term of this patent is extended or adjusted under 35 U.S.C. 154(b) by 0 days.

(21) Appl. No.: 12/005,961

(22) Filed: Dec. 28, 2007

(65) Prior Publication Data
US 2008/0174198 A1    Jul. 24, 2008

Related U.S. Application Data

(60) Provisional application No. 60/877,537, filed on Dec. 28, 2006.

(51) Int. Cl.
*H02K 1/00* (2006.01)
(52) U.S. Cl. ....................................... 310/179
(58) Field of Classification Search ................. 310/179, 310/182, 225
See application file for complete search history.

(56) References Cited

U.S. PATENT DOCUMENTS

| 3,754,147 | A | 8/1973 | Hancock et al. |
| 2002/0041129 | A1* | 4/2002 | Oohashi et al. ............. 310/179 |
| 2004/0108784 | A1* | 6/2004 | Higashino et al. ........... 310/179 |
| 2006/0048808 | A1 | 3/2006 | Ruckman et al. |

* cited by examiner

*Primary Examiner*—Nguyen N Hanh
(74) *Attorney, Agent, or Firm*—Kent A. Herink; Emily E. Harris

(57) ABSTRACT

A modified armature winding for a stator of an electrical generator having a pigtail shape to promote cooling of the stator. At least one turn of the windings is extended outside the circumferential periphery of the stator, preferably forming a loop. An electrical short is created near the circumferential periphery of the stator between the winding segments to prevent current from flowing through the pigtail winding segment.

4 Claims, 2 Drawing Sheets

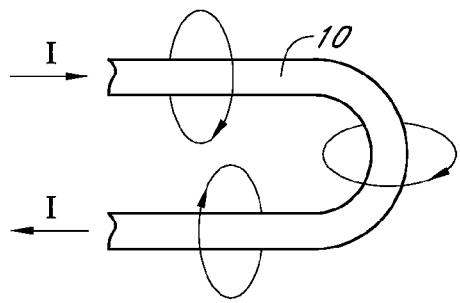
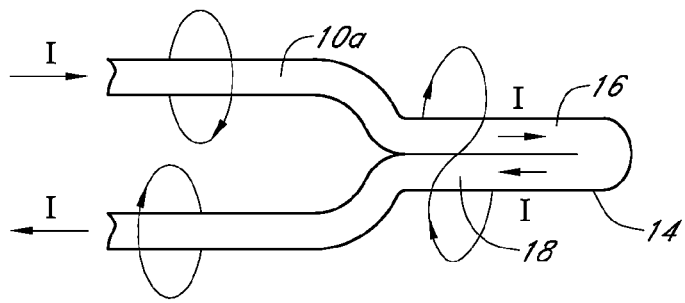
FIG. 3A          FIG. 3B
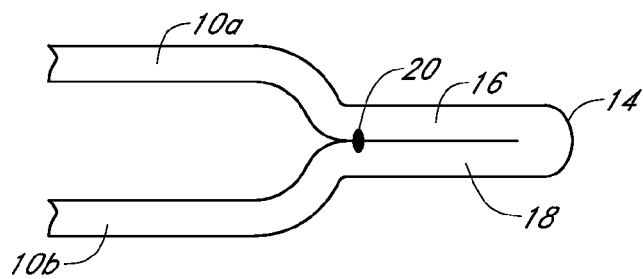
FIG. 4
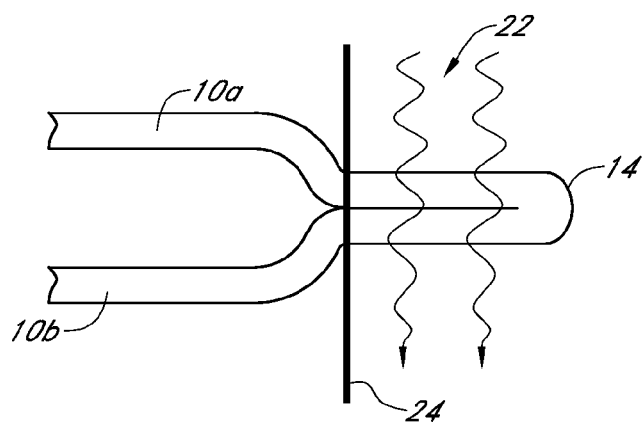
FIG. 5

PIGTAILED STATOR WINDINGS FOR ELECTRICAL GENERATOR

This application claims priority to U.S. patent application Ser. No. 60/877,537, filed Dec. 28, 2006.

BACKGROUND OF THE INVENTION

1. Field of the Invention

The present invention relates to a more efficient design for an electrical generator. In particular, the present invention comprises a series of stator windings that extend outside of the outer edge of the stator, creating what may be referred to as "pigtailed" stator windings, which substantially improve the heat distribution characteristics of an electrical generator.

2. Background

An electric generator is a device used to convert mechanical energy into electrical energy, which operates on the principal of electromagnetic induction discovered by Michael Faraday. This principal states that if an electric conductor, like a copper wire, is moved through a magnetic field, electric current will be induced in the conductor. So the mechanical energy of the moving wire is converted into the electric energy of the current that flows in the wire.

In practice, modern generators are oppositely configured, with a rotating magnet called a rotor spinning inside a stator. The rotor typically comprises one or more permanent magnets, each with two opposite magnetic poles. Reference to generators in terms of poles describes the number of magnets and the speed the generator can spin. A 2-pole generator has one magnet with a North pole and a South pole, hence, two poles. This generator needs to spin at 3600 rpm, to achieve a 60-Hertz target. A 4-pole generator has two magnets and needs to spin at 1800 rpm because with four poles, one complete 360 degree revolution delivers two cycles, to achieve the same target speed.

The stator surrounds the rotor, and is the part of the generator with the coils of wire and laminates. The stator usually comprises a cylindrical ring made of iron to provide an easy path for the magnetic flux. The coil, or coils are positioned around the periphery of the stator in slots in the iron and the ends are connected together by tightly wound conductors. The coil normally consists of a predetermined number of turns. When the rotor is rotated, a voltage is induced in the stator coil. At any instant, the magnitude of the voltage is proportional to the rate at which the magnetic field encircled by the coil is changing with time, i.e., the rate at which the magnetic field is passing the two sides of the coil. The voltage will therefore be maximum in one direction and will be maximum in the opposite direction 180° later. The waveform of the voltage will be approximately a sine curve.

One of natural unavoidable byproducts of electrical generators is heat. The dissipation of this heat is in practice a major limiting characteristic of an electrical generator. Conventionally, heat is dissipated from the copper windings through the laminations to the housing and then radiated through the air. This method suffers from at least three drawbacks: ((1) the lamination steel is a poor thermal conductor, which limits the rate of heat dissipation; (2) transferring the heat from the stator windings to the lamination steel and from the laminations to the housing is normally very inefficient; and (3) air is a poor cooling media.

An understanding of how heat dissipation limits electrical generators efficiency can been seen in the following illustration. A typical 114 KVA 2 pole generator has a rotor length of 26". It is known that doubling frequency of the generator will allow for halving the rotor length. In practice the end effects are such that a 26" rotor could be considered a 1"+24"+1" rotor. Increasing the pole count from 2 to 12 would increase the frequency of the electrical generator by a factor of 6. This would, in theory, allow for the use of a 1"+4"+1" rotor (or a 6" rotor), without any loss in efficiency. In practice, the arrangement is not practicable due to the fact that the same amount of heat must be dissipated over a much smaller surface area. In other words, the heat dissipation is spread out over a 6" long housing instead of a 26" long housing. Making this change in rotor size requires an increase in cooling by a factor 4.33 (26/6), just to maintain the status quo.

Accordingly, a need exists for improved heat dissipation in an electrical generator in order to take advantage of the economies of scale efficiencies of multiple pole smaller sized rotors.

SUMMARY OF THE INVENTION

The invention consists of armature windings of a stator of an electrical generator in which at least some of the windings have a length of the winding that extends in a loop beyond the normal circumferential periphery of the stator. The extended portions of the windings are referred to herein as pigtail windings. The pigtail windings have high thermal conductivity and so can conduct heat away from the stator. The pigtail windings are cooled by passing through a fluid, such as ambient air or a cooling liquid, and so serve to cool the stator. The pigtail windings are electrically shorted preferably at approximately the normal circumferential periphery of the stator to prevent magnetic field interference in the loop of the pigtail winding.

BRIEF DESCRIPTION OF THE DRAWINGS

FIG. 3a is a side view of a prior art winding and induced magnetic fields, and FIG. 3b is a side view of a pigtail winding showing current flow and interfering magnetic fields.

FIG. 4 is a side view of a pigtail winding that has been electrically shorted to prevent current from flowing in the pigtail section and thereby eliminating the interfering magnetic fields.

FIG. 5 is a side view corresponding to FIG. 4 and further showing a seal to prevent a cooling liquid from entering the generator housing.

DETAILED DESCRIPTION OF THE INVENTION

Figure 1:
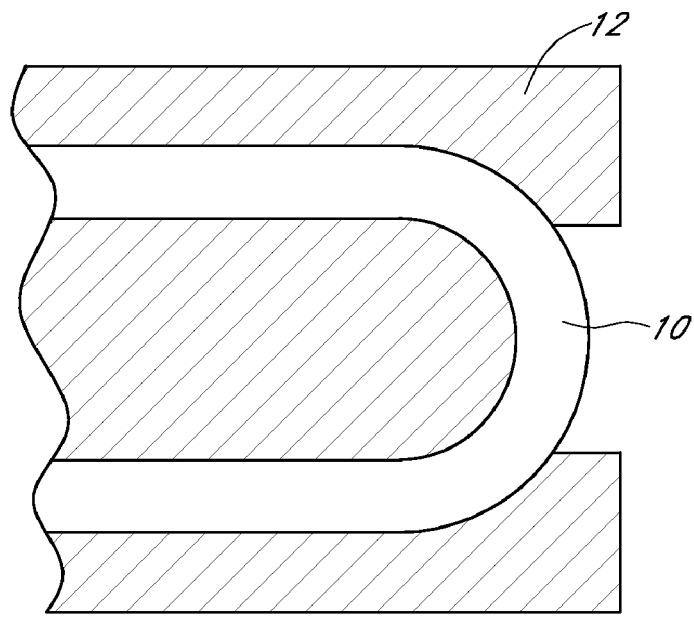
FIG. 1 is a cross-sectional view of a normal stator of an electrical generator showing a winding of the prior art.
Figure 2:
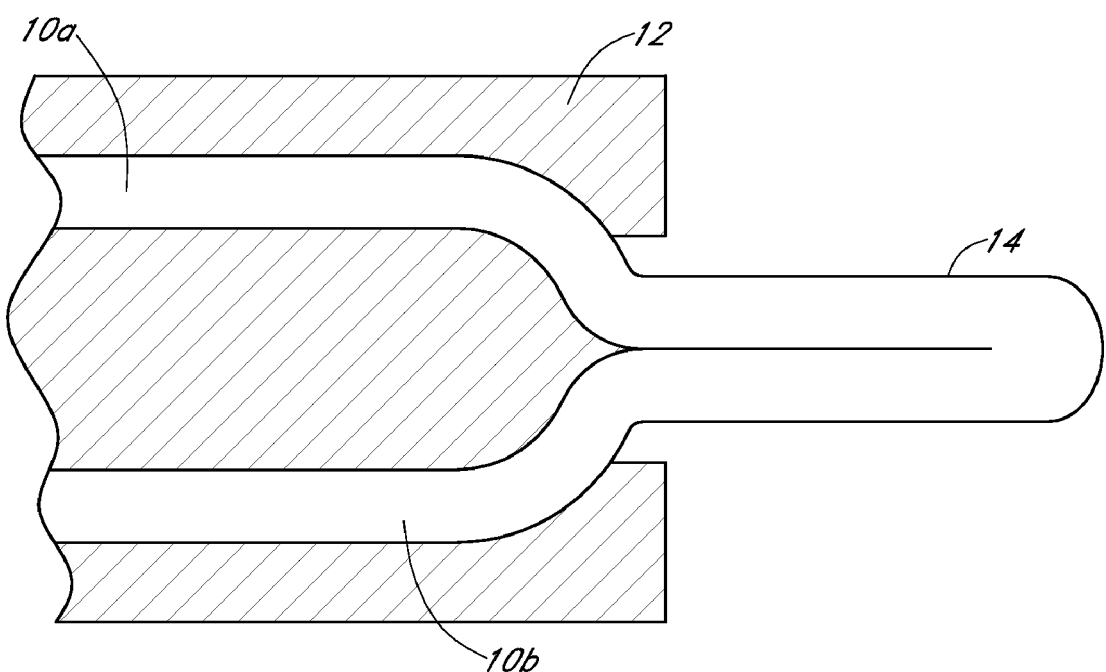
FIG. 2 is a cross-sectional view of a pigtail winding of the present invention.

The present invention comprises an improved electrical generator. In particular, the present invention provides for a pigtailed end for, preferably, each stator winding. As shown in FIG. 1, a normal stator winding 10 loops around the outside edge of the stator 12, with little or no surface area exposed to the ambient surrounding. The present invention, illustrated in FIG. 2, by contrast, extends the winding segment 10a a predetermined distance from the outer edge of the stator 12, and is referred to herein as a pigtail 14. The pigtail 14 then reconnects with winding segment 10b. This exposes the winding to the ambient surrounding, thereby creating a substantial surface area outside the circumferential periphery of the stator 12. The exposed surface area of the pigtail winding 14 creates an opportunity for enhanced cooling.

The pigtail 14, however, creates interfering fields that require some attention. In particular, electrical current induced in the windings 10 creates magnetic fields at right angles to the windings 10. Under normal conditions, the spacing of the stator windings 10 provides for sufficient space to prevent the magnetic fields from interfering with each other (FIG. 3*a*). The pigtail design 14, however, comprises a loop with closely spaced loop segments 16 and 18 (FIG. 3*b*). Since the current flows in opposite directions in the loop segments 16 and 18, opposing magnetic fields are generated around the now closely located winding segments 16 and 18.

The interfering fields can be eliminated by creating an electrical short 20 across the winding segments 16 and 18 of the pigtail 14 at the base to eliminate electrical current flow and therefore eliminate the magnetic field around the pigtail 14 (FIG. 4). The short 20 can be created by any conventional method such as spot welding. The exposed pigtail 14 must be insulated after shorting.

The shorted pigtail 14 has no magnetic field due to the fact that there is no electrical current in this portion of the winding 10. However, due to the excellent thermal conducting properties of the winding 10, typically copper, the pigtail 14 becomes a highly effective at dissipating heat to the ambient atmosphere. Alternatively, as shown in FIG. 5, the pigtail 14 can be immersed in a liquid cooling medium 22 to remove the excess heat. A liquid barrier 24 is required to prevent the cooling medium from entering the generator housing. Any conventional impervious material can be used as the liquid barrier 24. The barrier 24 is preferably doughnut shaped to conform to the shape of the stator. The barrier 24 conforms to the shape of the stator 12, thereby forming a seal without interfering access to the rotor for repair and installation purposes.

The cooling medium liquid 22 can be pumped through a conventional heat exchange system to remove excess heat and returned to the generator cooling loop for further heat removal. In this manner, the present invention substantially improves the heat dissipation characteristics of an electrical generator without introducing any drawbacks. This enables the use of smaller more efficient electrical generators without suffering from the drawbacks of the prior art.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention.

I claim:

1. An armature winding for a stator of an electrical generator, the stator having a circumferential periphery, comprising:
   (a) a first winding segment extended inside the circumferential periphery of the stator;
   (b) a second winding segment extended inside the circumferential periphery of the stator;
   (b) a third winding segment extended outside the circumferential periphery of the stator and interconnecting the first and second winding segments; and
   (c) an electrical short near the circumferential periphery of the stator between the winding segments to prevent current from flowing through the third winding segment.

2. A winding as defined in claim 1, wherein the third segment forms a loop.

3. A winding as defined in claim 1, wherein the first, second and third winding segments are formed of a continuous piece of conductor.

4. A winding as defined in claim 1, further comprising electrical insulation applied to the third segment.

* * * * *